United States Patent
Alexandrovsky et al.

[11] 3,708,017
[45] Jan. 2, 1973

[54] ARRANGEMENT FOR MOUNTING AGRICULTURAL IMPLEMENTS ON A TRACTOR WITH ROCKING SIDE TRANSMISSIONS

[76] Inventors: Nikolai Ivanovich Alexandrovsky, ulitsa Olega Koshevogo, 1, kv. 58; Vadim Fomich Pronko, ulitsa Stakhanovskaya, 37, kv. 25; Mikhail Ivanovich Perepechkin, ulitsa Promyshlennaya, 13/5, kv. 23; Petr Adamovich Amelchenko, ulitsa Gritsevtsa, 1, kv. 59, all of Minsk, U.S.S.R.

[22] Filed: Jan. 15, 1970

[21] Appl. No.: 2,989

[52] U.S. Cl. .................172/239, 172/439, 172/292, 180/41
[51] Int. Cl...A01b 63/111, A01b 63/28, B60g 19/00
[58] Field of Search......172/239, 445, 449, 439, 442, 172/444, 451, 657, 658, 459, 460; 280/461.1, 461 A, 460.1, 6, 43.24; 180/41

[56] References Cited

UNITED STATES PATENTS

| | | | |
|---|---|---|---|
| 3,247,910 | 4/1966 | Bunting | 172/460 |
| 2,970,654 | 2/1961 | Todd | 172/456 |
| 3,025,915 | 3/1962 | Kelly | 172/445 |
| 3,039,540 | 6/1962 | Ward | 172/455 |
| 1,255,599 | 2/1918 | Gross | 180/41 |
| 2,231,710 | 2/1941 | Ford | 180/41 |
| 2,551,314 | 5/1951 | Burton | 180/41 |
| 2,656,668 | 10/1953 | Wilzel | 56/209 |
| 2,774,435 | 12/1956 | Milliken | 180/41 |
| 3,408,798 | 11/1968 | Hale et al. | 180/41 |

FOREIGN PATENTS OR APPLICATIONS

| | | | |
|---|---|---|---|
| 738,881 | 10/1955 | Great Britain | 172/460 |
| L17489 | 7/1956 | Germany | 172/444 |
| 210,515 | 2/1968 | U.S.S.R. | 172/332 |

*Primary Examiner*—Robert E. Pulfrey
*Assistant Examiner*—C. W. Hanor
*Attorney*—Waters, Roditi, Schwartz and Nissen

[57] ABSTRACT

An arrangement for mounting agricultural implements on a tractor with rocking side transmissions comprising draw-bar links for mounting the agricultural implements thereon, lifting levers, and a system of links connecting said draw-bar links with the rocking side transmissions and serving to transmit the rocking motion of the transmissions to the draw-bar links.

1 Claim, 2 Drawing Figures

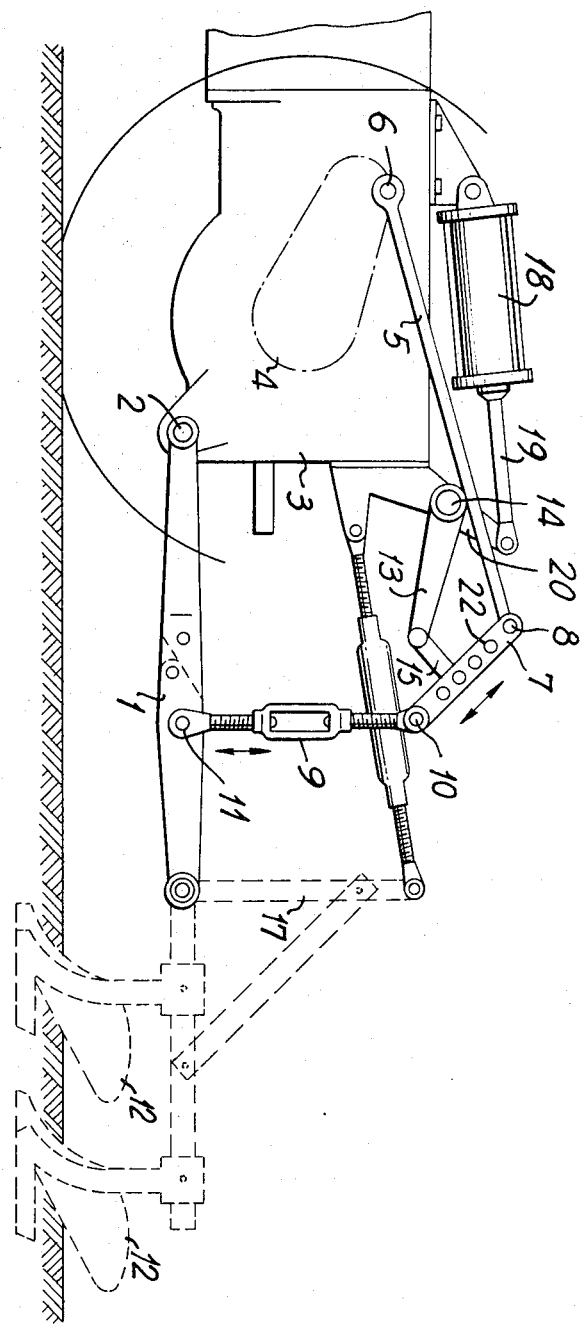
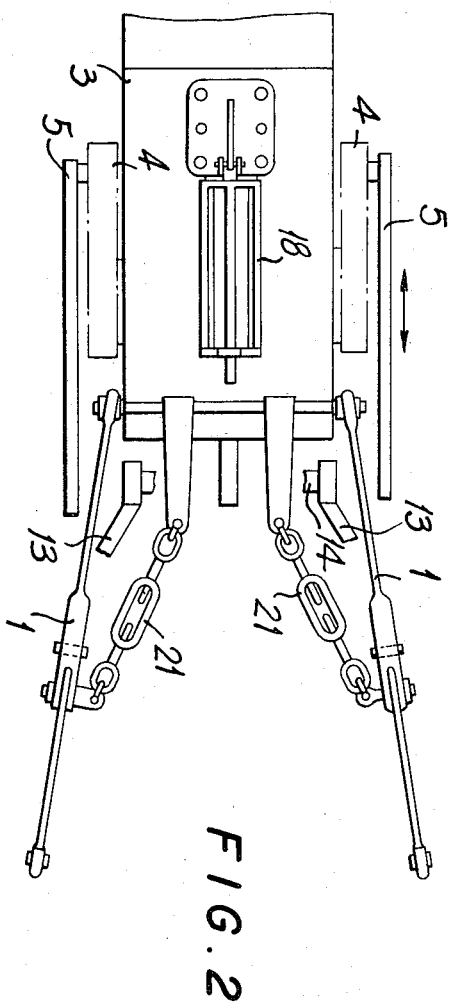

ARRANGEMENT FOR MOUNTING AGRICULTURAL IMPLEMENTS ON A TRACTOR WITH ROCKING SIDE TRANSMISSIONS

The present invention relates to the field of agricultural machinery, and more specifically it relates to arrangements for mounting agricultural implements on tractors with side transmissions, which are employed to cultivate agricultural crops on hillsides.

Known at present are arrangements for mounting agricultural implements on tractors with rocking side transmissions, comprising rods or draw-bar links articulated to the tractor frame, and intended for mounting the agricultural implements, and lifting levers connected with the draw-bar links and installed on a lift shaft, which is mounted on the tractor frame (see, for example, a book "Tractor Byelaruss" Selkhozgiz BSSR, 1961, p. 93).

The main condition for the normal operation of the tractors both in the plain and on hillsides is the parallelism of the plane on which the agricultural implements are located and the surface of the soil being cultivated, that is, these implements should follow said surface.

In the known arrangements the controls of the agricultural implements are connected only with the tractor frame, therefore the level of these implements does not change with respect to the surface of the soil being cultivated, that is this level remains parallel to the horizontal, but is not parallel to the surface of the soil being cultivated, although the tractor wheels do follow this surface. Thus said arrangements do not ensure normal operation of tractors on hillsides.

The main object of the invention is to develop an arrangement for mounting agricultural implements with such controls of these implements, that would ensure normal operation of a tractor with rocking side transmissions on hillsides, and would automatically keep the mounted agricultural implements parallel to the soil surface irrespective of the hillside steepness.

This object is achieved by that in the arrangement for mounting agricultural implements, comprising draw-bar links articulated to the tractor frame and intended for carrying the implements, and lifting levers connected with the draw-bar links and installed on the lift shaft which is mounted on the tractor frame, according to the invention, said draw-bar links are connected with the rocking side transmissions through a system of links transmitting the rocking motion of the transmissions to these draw-bar links. Such a design obviates the employment of agricultural implements of special design for hillside cultivation, and permits to mechanize the cultivation of agricultural crops with the help of conventional tractor-mounted implements used for plain cultivation.

It is expedient that said system of draw-bars should comprise leading links one end of each link being hinged to the rocking side transmissions, straps hinged to the free ends of the leading links, and braces, one end of each brace being hinged to the straps, and the other one to the draw-bar links, said straps being connected with the lifting levers.

For the sake of better understanding of the invention a description of a particular embodiment of this invention is given below with reference to the appended drawings, wherein:

FIG. 1 is a side view of the general schematic diagram of the arrangement according to the invention;

FIG. 2 shows the top view of the same.

The arrangement for mounting agricultural implements on the tractors with rocking side transmissions comprises two main interconnected units, one of which sets these implements into an appropriate working position, and the other one lifts and lowers these mounted agricultural implements.

The unit for setting the implements into the working position comprises draw-bar links 1 (FIGS. 1, 2) attached by means of a hinge 2 to the tractor frame 3, and a system of links connecting draw-bar links 1 with rocking side transmissions 4.

This system of links comprises leading links 5 whose ends are connected to the transmissions 4 by means of a hinge 6, straps 7, connected through hinges 8 to the free ends of the leading links 5, and braces or turnbuckles 9, one end of each brace being connected to straps 7 through hinges 10, and the other end being connected to draw-bar link 1 through a hinge 11. This system of links transmits the rocking motion of the transmissions 4 to draw-bar links 1 together with implements 12 mounted thereon, thus placing these implements parallel to the soil surface being cultivated. Thus, in their working position the agricultural implements follow the soil surface.

The unit for lifting and lowering implements 12 comprises lifting levers 13, mounted on a lift shaft 14 which is mounted on frame 3, and swivel arms 15 connected to straps 7 and levers 13.

This unit also comprises an additional link 16 one end of which is secured to frame 3, and the other end is connected to draw-bar link 1 through braces 17.

Shaft 14 is turned by a hydraulic cylinder 18 whose piston rod 19 is connected with this shaft through lever 20.

The arrangement includes adjustable links 21 limiting the horizontal displacements of implements 12 during the tractor movement.

A required working position of the agricultural implements is ensured by changing the position of the hinge 6 and by connecting lever 15 to the appropriate hole 22 in strap 7.

The arrangement operates as follows.

Once the hydraulic cylinder 18 is set in operation, the agricultural implements 12 mounted on the tractor are lifted and lowered.

As oil is fed into the hydraulic cylinder 18, its piston rod 19 moves actuating lever 20 fitted on the lift shaft 14, which lever through this shaft acts on the lifting levers 13, and further through the swivel arms 15 acts on braces 9 and actuates draw-bar links 1, thus lifting or lowering the agricultural implements 12.

The adaptation of the mounted implement to the hillside is ensured during the stabilization of the vertical position of frame 3 of the tractor owing to turning of its side transmission 4 by one and the same angle, but to opposite directions when the tractor moves across the hillside. During said turning of the transmissions 4 the leading links 5 articulated there to are displaced. Through straps 7 said links act on braces or turnbuckles 9, lifting or lowering, respectively, the left and right draw-bar link 1 in opposite directions. Due to the fact that the draw-bar links 1 are connected with the rocking transmissions 4 one side of the mounted implement is lifted simultaneously with the lowering of the other side thereof, that is an inversely proportional correction of the implement tilt is performed depending on the position of the tractor frame.

What we claim is:

1. An arrangement for mounting agricultural implements on a tractor having rocking side transmissions, comprising, draw-bar linkage means pivotably connected to the frame of said tractor and adapted to have agricultural implements mounted thereon; a system of links interconnecting said-bar linkage means with said side transmissions, said links tramsmitting the rocking motion of said side transmissions to said draw-bar linkage means; lifting lever means connected to said draw-bar linkage means; and a lift shaft mounted on said tractor frame, said lift shaft supporting said lifting lever means for selectively conveying raising or lowering movement to said draw-bar linkage means and the agricultural implements mounted thereon, wherein said link system comprises a plurality of leading links pivotally connected to said transmission, straps on each said leading links, each of said straps being hinged respectively to the free ends of the leading links; and a plurality of turnbuckle braces on said tractor frame, said turnbuckle braces being each connected at one end to said straps and other end to said draw-bar linkage means, said straps being connected with said lifting lever means.

* * * * *